(12) United States Patent
Walden et al.

(10) Patent No.: US 8,060,409 B2
(45) Date of Patent: Nov. 15, 2011

(54) CERTIFICATION AND ACTIVATION OF USED PHONES PURCHASED THROUGH AN ONLINE AUCTION

(75) Inventors: Michael Walden, Annapolis, MD (US); David A. Steinberg, Washington, DC (US)

(73) Assignee: Simplexity, LLC, Philadelphia, PA (US)

(*) Notice: Subject to any disclaimer, the term of this patent is extended or adjusted under 35 U.S.C. 154(b) by 1021 days.

(21) Appl. No.: 11/897,466

(22) Filed: Aug. 30, 2007

(65) Prior Publication Data

US 2007/0299764 A1 Dec. 27, 2007

Related U.S. Application Data

(63) Continuation of application No. 10/389,899, filed on Mar. 18, 2003, now Pat. No. 7,493,105.

(51) Int. Cl.
*G06Q 30/00* (2006.01)

(52) U.S. Cl. ............................................. 705/26; 705/27

(58) Field of Classification Search .................... 705/26, 705/37, 27
See application file for complete search history.

(56) References Cited

U.S. PATENT DOCUMENTS

| | | |
|---|---|---|
| 4,629,836 A | 12/1986 | Walsworth |
| 4,799,156 A | 1/1989 | Shavit et al. |
| 4,903,201 A | 2/1990 | Wagner |
| 5,272,747 A | 12/1993 | Meads et al. |
| 5,289,526 A | 2/1994 | Chymyck et al. |
| 5,471,526 A | 11/1995 | Linnermark et al. |
| 5,572,571 A | 11/1996 | Shirai |
| 5,682,525 A | 10/1997 | Bouve et al. |
| 5,710,887 A | 1/1998 | Chelliah et al. |
| 5,758,328 A | 5/1998 | Giovannoli |
| 5,794,207 A | 8/1998 | Walker et al. |
| 5,794,219 A | 8/1998 | Brown |
| 5,809,413 A | 9/1998 | Meche et al. |
| 5,815,665 A | 9/1998 | Teper et al. |
| 5,828,956 A | 10/1998 | Shirai |
| 5,835,896 A | 11/1998 | Fisher et al. |
| 5,845,265 A | 12/1998 | Woolston |
| 5,862,223 A | 1/1999 | Walker et al. |
| 5,862,472 A | 1/1999 | Park |
| 5,887,253 A | 3/1999 | O'Neil et al. |
| 5,905,975 A | 5/1999 | Ausubel |
| 5,917,897 A | 6/1999 | Johnson et al. |
| 5,949,875 A | 9/1999 | Walker et al. |

(Continued)

FOREIGN PATENT DOCUMENTS

WO WO-01/84840 A1 11/2001

(Continued)

OTHER PUBLICATIONS

Sheaer, Equipment to be sold at auction, cell phones, Patriot News, Harrisburg, PA, Aug. 18, 2001, downloaded from ProQuest Direct on the Intenret on Sep. 30, 2010, 1 page.*

(Continued)

*Primary Examiner* — James Zurita
(74) *Attorney, Agent, or Firm* — Patton Boggs LLP

(57) ABSTRACT

A system and method for providing an online auction of a wireless device. An indicator is displayed to a winner of an online auction of the wireless device. The indicator is associated with an option for the user to certify the wireless device for use with one or more providers of telecommunications services. The wireless device is certified in response to the selection of the indicator by the winner.

17 Claims, 4 Drawing Sheets

U.S. PATENT DOCUMENTS

| | | | |
|---|---|---|---|
| 5,966,654 | A | 10/1999 | Croughwell et al. |
| 6,006,251 | A | 12/1999 | Toyouchi et al. |
| 6,018,656 | A | 1/2000 | Shirai |
| 6,023,685 | A | 2/2000 | Brett et al. |
| 6,023,686 | A | 2/2000 | Brown |
| 6,055,504 | A | 4/2000 | Chou et al. |
| 6,085,171 | A | 7/2000 | Leonard |
| 6,104,798 | A | 8/2000 | Lickiss et al. |
| 6,144,727 | A | 11/2000 | Mashinsky |
| 6,223,290 | B1 | 4/2001 | Larsen et al. |
| 6,233,566 | B1 | 5/2001 | Levine et al. |
| 6,260,024 | B1 | 7/2001 | Shkedy |
| 6,269,343 | B1 | 7/2001 | Pallakoff |
| 6,301,574 | B1 | 10/2001 | Thomas et al. |
| 6,308,053 | B1 | 10/2001 | Nilsson |
| 6,385,594 | B1 | 5/2002 | Lebda et al. |
| 6,418,415 | B1 | 7/2002 | Walker et al. |
| 6,556,820 | B1 | 4/2003 | Le et al. |
| 6,598,026 | B1 | 7/2003 | Ojha et al. |
| 6,662,023 | B1 | 12/2003 | Helle |
| 6,665,529 | B1 | 12/2003 | Mills, Jr. |
| 6,771,954 | B1 | 8/2004 | Yoneyama et al. |
| 6,782,251 | B2 | 8/2004 | Kagay, Jr. |
| 2002/0001372 | A1 | 1/2002 | Katz |
| 2002/0186845 | A1 | 12/2002 | Dutta et al. |
| 2004/0218045 | A1* | 11/2004 | Bodnar et al. ............. 348/207.1 |

FOREIGN PATENT DOCUMENTS

| | | | |
|---|---|---|---|
| WO | WO-02/01891 A2 | 1/2002 | |

OTHER PUBLICATIONS

PR Newswire, ReCelluar Answers the call to Refurbish Used Wireless Phones, PR Newswire, New York, Mar. 17, 2003, downloaded from ProQuestDirect on the Internet on Sep. 20, 2010, 4 pages.*

ReCellular Builds on Successful Wireless GSM Auction Program with New CDMA and TDMA Offerings, Anonymous. Business Wire. New York: Jan. 16, 2008, downloaded from ProQuestDirect on the Internet on Jun. 15, 2011, 1 page.*

Accompany—Internet Purchasing through agregation, access & advocacy, http://www.accompany.com; 3 pages.

Telezoo.com: telecommunications Mar . . . Products and Connectivity Services, http://www.telezoo.com; 5 pages.

Demandline.com: How Demandline.com Works, http://www.demandline.com; 6 pages.

Anon., "Industry.Net Teams With PNC Bank on Web Commerce," Newsbytes News Network, Sep. 26, 1996.

* cited by examiner

CERTIFICATION AND ACTIVATION OF USED PHONES PURCHASED THROUGH AN ONLINE AUCTION

CROSS-REFERENCE TO RELATED APPLICATION

This application is a continuation of prior U.S. application Ser. No. 10/389,899, filed Mar. 18, 2003, now U.S. Pat. No. 7,493,105 which is hereby incorporated herein by reference.

BACKGROUND OF THE INVENTION

1. Field of the Invention

The present invention relates to telecommunication services systems and methods, and in particular, to telecommunication services systems and methods that enable a buyer to certify and activate a used wireless telecommunications device. The systems and methods may also be employed to provide the buyer of a used wireless telecommunications device with specialized pricing options and other customized services.

2. Description of the Prior Art

Security elements, which are becoming an essential component of telecommunication services, are used to authenticate the buyer of a wireless telecommunications device. Based on current technology, security elements may take many forms, including removable and non-removable types, relative to the telecommunications device. A well-known removable type of security element is a subscriber identity module (SIM), currently used in telecommunications devices that operate according to the Global System for Mobile (GSM) standard.

A service certificate is an electronic document signed by a trusted third party, i.e., a certification agency (CA)—which states that a named entity is a certified buyer of the public key contained in the certificate for the service identified by the certificate number. Service certificates may be used as electronic credit cards in mobile e-commerce. However, since many "credit cards" can be assigned to a small number of key pairs, the issuer of the security may not be the issuer of the service certificate, so that the issuer of the security element does not control all uses of the security element.

Currently, if a SIM-enabled wireless telecommunications device is lost or stolen, a buyer can notify his or her wireless service provider, who can block access to the network at the wireless infrastructure. FIG. 1 illustrates this scenario. Wireless phone 101 using SIM card 102 normally accesses the wireless operator's infrastructure 103 through public land mobile network (PLMN) 104. In turn, the public switched telephone network (PSTN), 105, and the Internet, 106 can be accessed. When access to the network is denied at infrastructure 103, as indicated by the cross in the box depicting 103, the denial of service is based on the phone number of the lost phone recorded in the phone's SIM card.

A legitimate buyer of the wireless telecommunications device notifies the certificate issuer of the loss. The issuer then adds its certificate to a certificate revocation list (CRL) which is sent to telecommunication services provider, 203, through the regular secure payment gateway, 206, so that the telecommunication services provider knows to deny attempts to use the wireless telecommunications device.

U.S. Pat. No. 5,289,526 discloses a method and apparatus for monitoring and reporting information relating to the operation of cellular telephone systems. The patent discloses that the method and apparatus may be employed to analyze the performance of a cellular system as it is acting in the field.

U.S. Pat. No. 5,471,526 discloses a method and apparatus for detecting events occurring in a telecommunications network. The method and apparatus include stored program control exchanges that execute software programs having controlled sequences that are responsive to certain events.

U.S. Pat. Nos. 5,572,571; 5,828,956; and 6,018,656 disclose a method and apparatus that permit a buyer to program the necessary information to incorporate a cellular telephone into a network without assistance from a dealer.

U.S. Pat. No. 6,223,290B1 discloses a method and apparatus for controlling use of an electronic system, including a cellular telephone. The patent discloses that the method and apparatus may be employed to identify and prevent fraudulent use of the cellular telephone.

U.S. Application No. 2002/0186845A1 discloses a method and apparatus for remotely disabling and enabling access to secure transaction functions of a mobile phone. The method and apparatus, which enable a buyer to immediately block access to the payment and buyer authentication functions in a security element of the phone, include a step or means for verifying the authenticity of the buyer.

WO 02/01891 discloses a system for storing information while using a mobile communication device such as a mobile phone. The system, which stores data from a mobile communications device over a mobile communications network to a remote storage device, permits a buyer to have access to increased capacity.

None of the references discloses or suggests a system or method that enables a buyer to certify and activate a used wireless telecommunications device. There is thus a need for a system and method that enables a buyer to certify and activate a used wireless telecommunications device.

SUMMARY OF THE INVENTION

All patents and patent publications cited herein are hereby incorporated herein by reference.

An object of the present invention is to provide a system and method that enable a buyer to certify and activate a used wireless telecommunications device.

According to an object of the invention, the system comprises a web server and the method comprises the use of the web server. The system and method involve the buyer using the web server to certify and activate a used wireless telecommunications device. The buyer may also use the web server to access additional information related to telecommunication services available to the buyer. In accordance with this object, a system and method for accessing information and for establishing a telecommunication services account are provided. The system and method comprise providing access to information regarding telecommunication services and optionally establishing an account for the telecommunication services.

According to another object of the invention, the system comprises a live operator and the method comprises the use of the live operator. The system and method involve the buyer contacting the live operator via, e.g., the use of an "800" number and communicating with the live operator to certify and activate a used wireless telecommunications device. The buyer may also use the live operator to access additional information related to telecommunication services available to the buyer. In accordance with this object, a system and method for accessing information and for establishing a telecommunication services account are provided. The system and method comprise providing access to information regarding telecommunication services and optionally establishing an account for the telecommunication services.

According to yet another object of the invention, the system comprises an e-mail system and the method comprises the use of the e-mail system. The system and method involve the buyer using the e-mail system to certify and activate a used wireless telecommunications device. The buyer may also use the e-mail system to access additional information related to telecommunication services available to the buyer. In accordance with this object, a system and method for accessing information and for establishing a telecommunication service are provided. The system and method comprise providing access to information regarding telecommunication services and optionally establishing an account for the telecommunication services.

According to yet a further object of the invention, the system comprises an interactive voice system ("IVS") and/or an interactive data system ("IDS"). Once the buyer is identified, the buyer may obtain information regarding its used telecommunication device and/or available telecommunication services. The system and method involve the buyer using the IVS and/or the IDS to certify and activate a used wireless telecommunication device. The buyer may also use the IVS and/or IDS to access additional information related to telecommunication services available to the buyer. In accordance with this object, a system and method for accessing information and for establishing a telecommunication service are provided. The system and method comprise providing access to information regarding telecommunication services and optionally establishing an account for the telecommunication services.

These and other objects of the invention will be apparent to those of ordinary skill in the art from the following Detailed Description and the drawings.

DETAILED DESCRIPTION OF THE PREFERRED EMBODIMENTS

Figure 1:
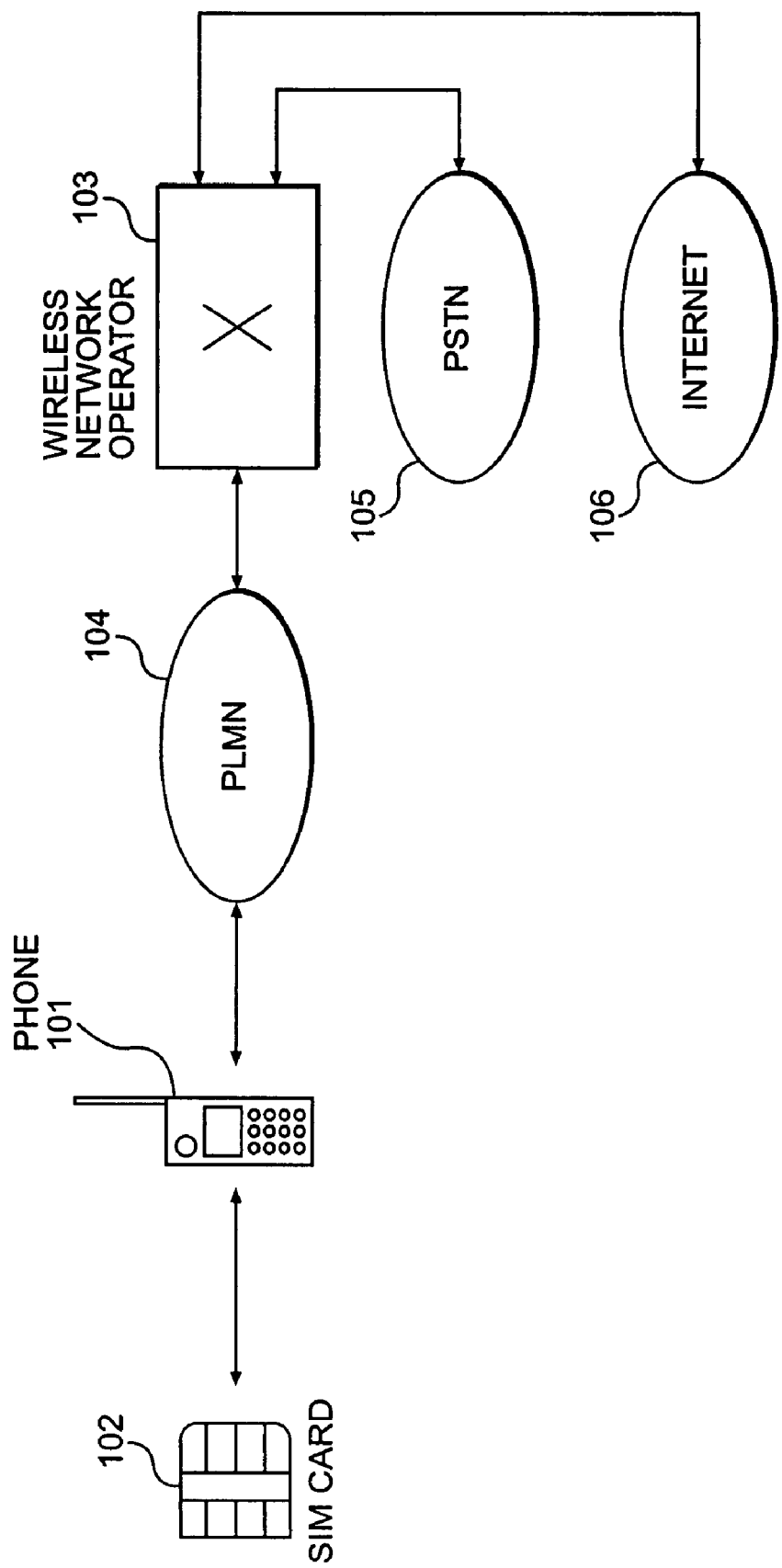
FIG. 1 illustrates one way a lost or stolen telecommunications device is disabled in the prior art.
Figure 2A:
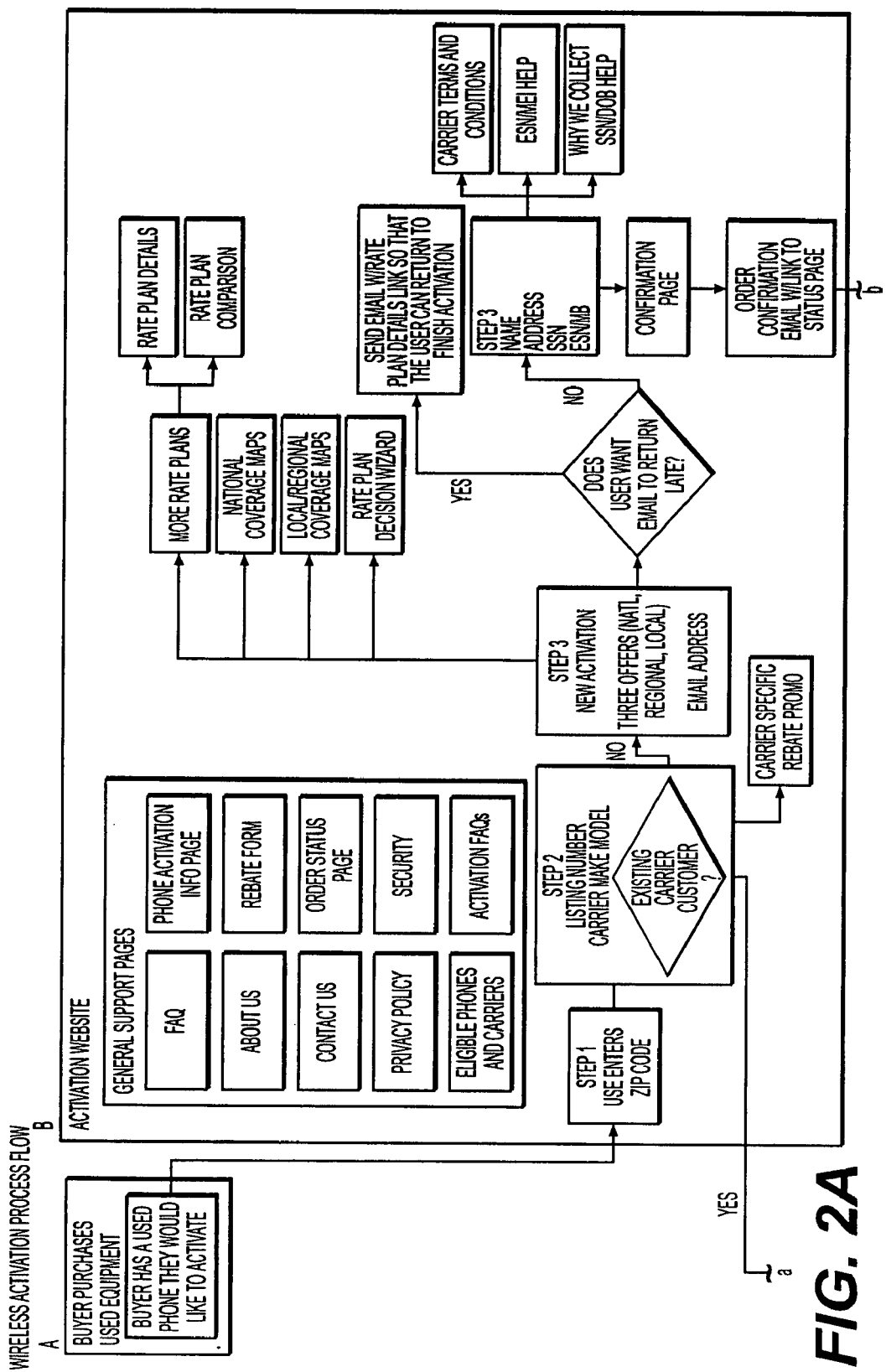
FIG. 2 is a flow chart showing an example of a system and method that enable a buyer to certify and activate a used wireless telecommunications device in accordance with the invention.
Figure 2B:
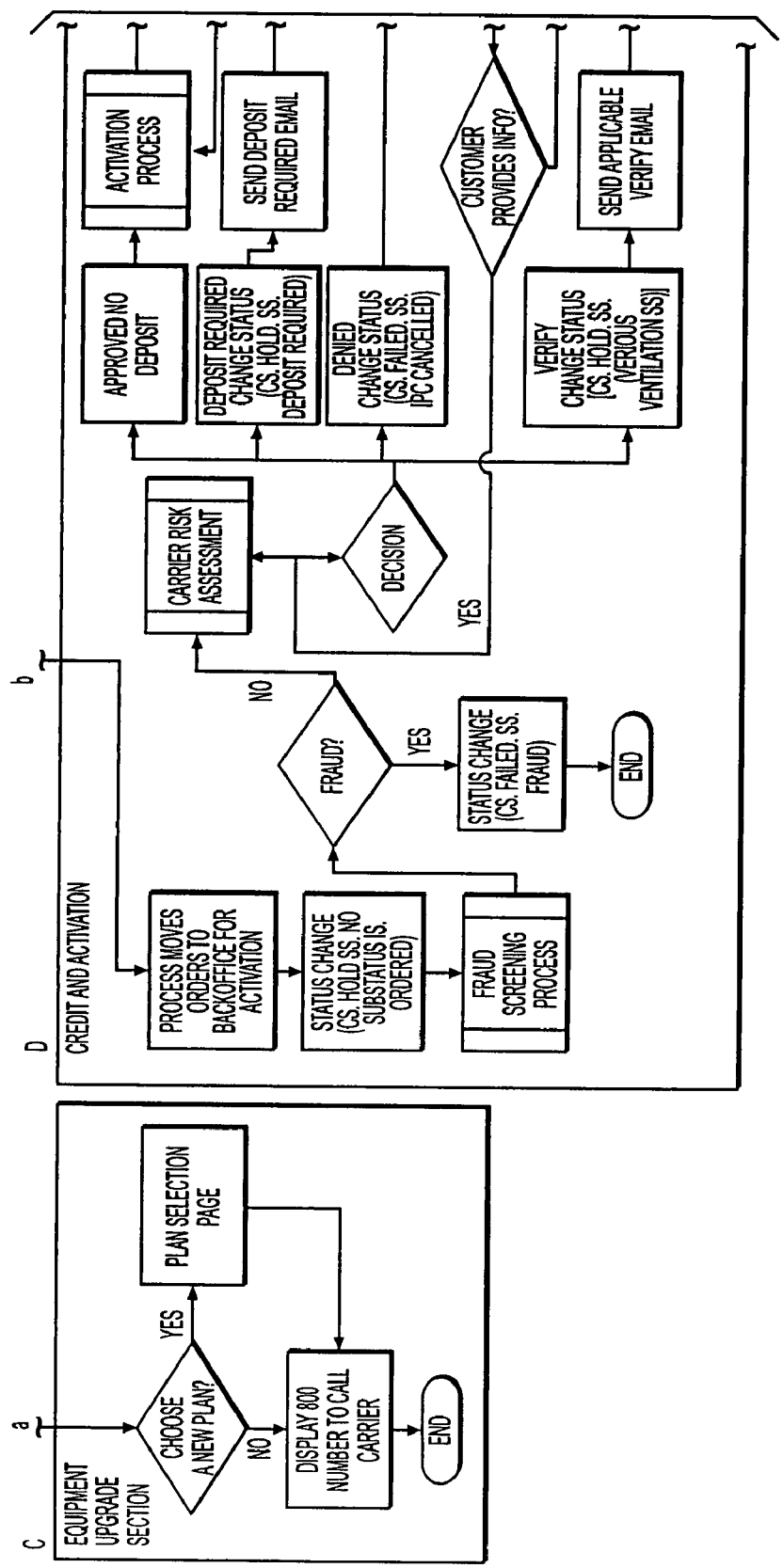
Figure 2C:
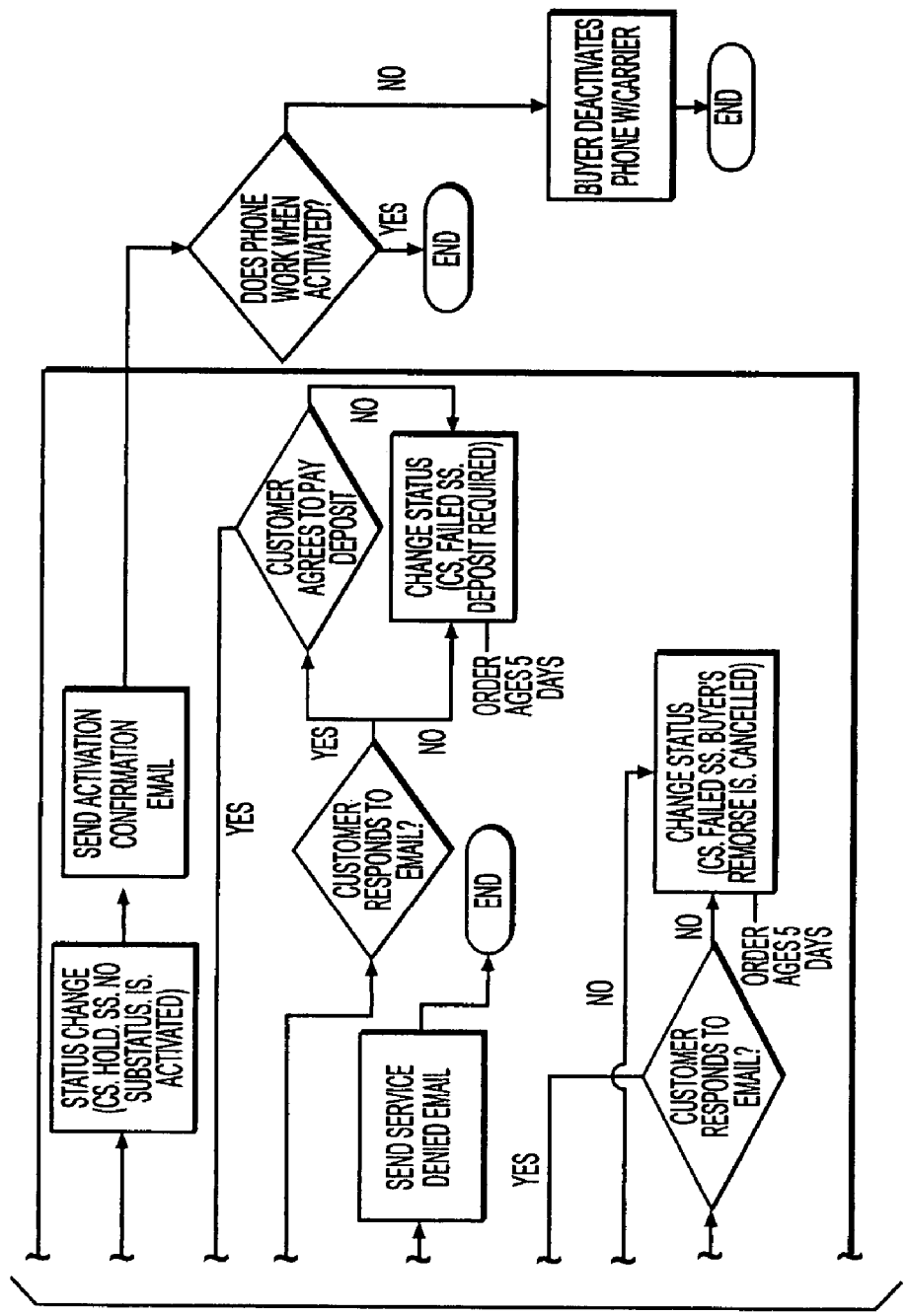

The invention will now be described by reference to FIG. 2. FIG. 2 is a flow chart showing an example of a system and method that enable a buyer to certify and activate a used wireless telecommunications device in accordance with the invention. Although FIG. 2 regards the use of a website for certification and activation, as discussed herein, certification and/or activation may also be accomplished by other means, including via e-mail communication, via an IVS and/or an IDS, and/or via interaction with a live operator.

An exemplary embodiment of the present invention is a method for enabling access to a used telecommunications device comprising receiving a request from a buyer, identifying one or more telecommunication services providers available to the buyer; allowing the buyer to select a telecommunication services provider; and communicating the buyer's selection to the telecommunication services provider, wherein said telecommunication services provider enables access to said used telecommunications device.

Referring to FIG. 2, a buyer purchases a used wireless telecommunications device by use of, for example, an on-line purchasing service. The buyer then accesses a "certification and activation" website through which the buyer may submit a request for telecommunication services. Although the term "certification and activation" website is employed herein, it is to be understood that it is contemplated that certification and activation are independent steps in the system and method of the invention and that each can be carried out independently via each of the means described herein.

The certification and activation website first queries the buyer to determine whether the used telecommunication device is approved for the network and that it is not listed on the "do not activate" list as lost, missing, stolen, etc. The certification is accomplished by the buyer identifying the used telecommunication device via, e.g., the used telecommunication device's identification number, and the certification and activation website processing this information to determine whether the used telecommunication device is certifiable. Once the buyer's use of the used telecommunication device is certified, the web site then provides information regarding telecommunication services that are available to the buyer. The buyer may access this information by entering information regarding the buyer's anticipated usage area, e.g., a zip code. As demonstrated in more detail in the example below, the buyer is then provided with the option of activating its telecommunications device. At this time, the buyer is also provided with various options with regard to its telecommunications services.

After the buyer selects a telecommunication service provider, that selection is communicated to the services provider and the services provider enables access to the used telecommunications device. The website, IVS, IDS and/or live operator may then confirm that the telecommunications device is enabled.

According to another exemplary embodiment of the invention, an apparatus is provided for remotely enabling access to a used telecommunications device comprising means for receiving a request from a buyer, means for identifying one or more telecommunication services carriers available to the buyer, means for allowing the buyer to select a telecommunication services provider, means for communication the buyer's selection to the telecommunication services provider, and means for said telecommunication services provider to enable access to said used telecommunications device.

According to another exemplary embodiment a computer program is provided for enabling access to a used telecommunications device comprising means for receiving a request from a buyer, means for identifying one or more telecommunication services providers available to the buyer, means for allowing the buyer to select a telecommunication services provider, and means for communicating the buyer's selection to the telecommunication services provider, wherein said telecommunication services provider enables access to said used telecommunications device.

According to another exemplary embodiment a programmed computer system is provided for enabling access to a used telecommunications device comprising means for receiving a request from a buyer; means for identifying one or more telecommunication services providers available to the buyer, means for allowing the buyer to select a telecommunication services provider, and means for communicating the buyer's selection to the telecommunication services provider, wherein said telecommunication services provider enables access to said used telecommunications device.

The system and method of the invention may be employed in combination with on-line purchasing services. By way of example, the invention provides a method for the on-line purchasing service auction winners to enter information about their used telecommunications device and certify and activate the used telecommunications device.

The first step in the process is for an on-line seller to add HTML to their auction listing encourage buyers to certify and activate their used telecommunications device after purchase. A buyer who has won a telecommunications device can then access a site explaining available telecommunication services by clicking on a link from the auction or the end-of-auction e-mail sent by the on-line purchasing service. If the buyer chooses to continue, it can enter information that is used by the telecommunication services provider to identify which carriers have service in the buyer's anticipated usage area. Such information may include, but is not limited to, the buyer's area code, the buyer's zip code, etc. The buyer can also access a telecommunications device selection page where it may identify its telecommunications device by, e.g., manufacturer, model number, and carrier. Next, the buyer is presented with the option to choose a telecommunication services plan. Once a buyer has selected a telecommunication services plan, it is presented with a screen asking it to enter activation information (e.g., name, address, and information used by the carriers to do a credit assessment on the buyer).

Once the order has entered the telecommunication service providers' database, the order is communicated to the telecommunication service provider's certification and activation system and is treated as a special type of activation. E-mail, IVS and/or IDS statuses are sent to the buyer throughout the activation process to let the buyer know the status of the order. The buyer may also access status information via the internet. Once activation is successful, a welcome kit is shipped to the buyer along with an e-mail, an IVS and/or an IDS announcement announcing the successful activation as well as instructions (when necessary.

While, in the foregoing, the present invention has been described in accordance with specific embodiments, those skilled in the art would appreciate that variations of these embodiments fall within the scope of the invention. As a result, the invention is not limited to the specific examples and illustrations discussed above.

What is claimed is:

1. A method for providing an online auction of a previously activated wireless telecommunications device, the method comprising:
a web server connected to one or more online client devices, wherein the web server performs a method stored in a storage medium and executed by one or more processors comprising:
forwarding an indicator for display on the client device to a user, where the user is a winner of an online auction of the previously activated wireless telecommunications device, the indicator being associated with an option for the user to certify the previously activated wireless telecommunications device for use with one or more providers of telecommunications services; and
certifying the previously activated wireless telecommunications device in response to the selection of the indicator by the user, wherein certifying the previously activated wireless telecommunications device further comprises comparing an identifier associated with the previously activated wireless telecommunications device to one or more identifiers associated with one or more wireless telecommunications devices that are indicated as not certifiable by the one or more providers of telecommunications services.

2. The method of claim 1, further comprising:
identifying the one or more telecommunications service providers;
receiving a selection associated with one of the one or more telecommunications service providers; and
enabling access by the previously activated wireless telecommunications device to the telecommunications services provided by the selected one of the one or more telecommunications service providers.

3. The method of claim 2, further comprising:
conveying the selection to the selected one or more telecommunications service providers.

4. The method of claim 1, wherein the displaying and certifying occurs through an online auction website.

5. The method of claim 1, further comprising:
requesting telecommunication services through a certification and activation website.

6. The method of claim 1, further comprising:
querying the user of the previously activated wireless device to determine whether the previously activated wireless telecommunications device is approved for a network associated with the provider of telecommunications services.

7. The method of claim 6, wherein the previously activated wireless telecommunications device is approved for the network if the previously activated wireless telecommunications device is not listed on a do not activate list.

8. The method of claim 1, further comprising:
accessing an information site explaining available telecommunications services.

9. The method of claim 8, wherein the information site is linked from the online auction website.

10. The method of claim 8, wherein the information site is linked from an end-of-auction email.

11. A website for activating a previously activated wireless telecommunications device comprising:
a plurality of modules, operating on a web server connected to one or more online client devices, each of the one or more online client devices including a web browser, the plurality of modules comprising:
a displaying module for providing an indicator for display on the client device to a user, where the user is a winner of an online auction of the previously activated wireless telecommunications device, wherein the wireless telecommunications device was previously used to access a telecommunications service, the indicator being associated with an option for the user to certify the previously activated wireless telecommunications device for use with one or more providers of telecommunications services; and
a certification module for certifying the previously activated wireless telecommunications device in response to the selection of the indicator by the user, wherein certifying the wireless telecommunications device further comprises comparing an identifier associated with the wireless telecommunications device to one or more identifiers associated with wireless telecommunications devices that are indicated as not certifiable by the one or more telecommunications service providers.

12. The website of claim 11, wherein the displaying module presents the one or more providers of telecommunications services based on the anticipated usage area of the user.

13. The website of claim 11, wherein the website communicates with the user through an interactive voice system.

14. The website of claim 11, wherein the certification module allows the user to establish an account with the one or more providers of telecommunications services.

15. The website of claim 11, wherein the website is an online-auction.

16. A computer program product comprising a non-transient computer usable medium including computer usable program code for activating a used previously activated wireless telecommunications device, the computer program product comprising:
    computer usable program code for forwarding displaying an indicator for display on a client device to a user, where the user is a winner of an online auction of the previously activated wireless telecommunications device, the indicator being associated with an option for the user to certify the used previously activated wireless telecommunications device for use with one or more providers of telecommunications services; and
    computer usable program code for certifying the used previously activated wireless telecommunications device in response to the selection of the indicator by the user;
    wherein certifying the wireless telecommunications device further comprises comparing an identifier associated with the wireless telecommunications device to one or more identifiers associated with wireless telecommunications devices that are indicated as not certifiable by the one or more telecommunications service providers.

17. The computer program product of claim 16, comprising:
    computer usable program code for receiving activation information from the user; and
    computer usable program code for sending the activation information to a selected telecommunications service provider.

* * * * *